(12) United States Patent
Hillier

(10) Patent No.: US 11,179,677 B2
(45) Date of Patent: Nov. 23, 2021

(54) SEALING CASE FOR FILTER CASSETTE

(71) Applicant: EMD Millipore Corporation, Burlington, MA (US)

(72) Inventor: Brian Hillier, Lowell, MA (US)

(73) Assignee: EMD Millipore Corporation, Burlington, MA (US)

( * ) Notice: Subject to any disclaimer, the term of this patent is extended or adjusted under 35 U.S.C. 154(b) by 0 days.

(21) Appl. No.: 15/562,171

(22) PCT Filed: Jun. 1, 2016

(86) PCT No.: PCT/US2016/035133
§ 371 (c)(1),
(2) Date: Sep. 27, 2017

(87) PCT Pub. No.: WO2017/003625
PCT Pub. Date: Jan. 5, 2017

(65) Prior Publication Data
US 2018/0078903 A1    Mar. 22, 2018

Related U.S. Application Data

(60) Provisional application No. 62/186,773, filed on Jun. 30, 2015.

(51) Int. Cl.
*B01D 61/10* (2006.01)
*B01D 65/00* (2006.01)
(Continued)

(52) U.S. Cl.
CPC ............. *B01D 61/08* (2013.01); *B01D 61/10* (2013.01); *B01D 63/082* (2013.01);
(Continued)

(58) Field of Classification Search
CPC ................ B01D 65/003; B01D 63/082; B01D 2315/16; B01D 2313/48; B01D 2313/44;
(Continued)

(56) References Cited

U.S. PATENT DOCUMENTS

| 4,867,876 A | 9/1989 | Kopf |
| 5,227,137 A | 7/1993 | Monti et al. |

(Continued)

FOREIGN PATENT DOCUMENTS

| CN | 101992026 A | 3/2011 |
| CN | 102177368 A | 9/2011 |

(Continued)

OTHER PUBLICATIONS

International Search Report and Written Opinion received for PCT Application No. PCT/US2016/035133, dated Aug. 30, 2016, 12 pages.

(Continued)

*Primary Examiner* — Lucas A Stelling
*Assistant Examiner* — Angel Olivera
(74) *Attorney, Agent, or Firm* — EMD Millipore Corporation

(57) ABSTRACT

A sealing case for a filtration cassette that reliably prevents leaks after assembly and installation into a filtration system. The sealing case fits on the filtration cassette and provides a fluid-tight seal between the sealing case and around at least one port in the filtration cassette when installed in a filtration system. The sealing case may comprise two halves that mate together, and each half may be identical. The internal surface of the sealing case is flat or substantially flat.

7 Claims, 2 Drawing Sheets

(51) Int. Cl.
*B01D 61/08* (2006.01)
*B01D 63/08* (2006.01)

(52) U.S. Cl.
CPC ...... *B01D 65/003* (2013.01); *B01D 2313/025* (2013.01); *B01D 2313/04* (2013.01); *B01D 2313/20* (2013.01); *B01D 2313/44* (2013.01); *B01D 2313/48* (2013.01); *B01D 2315/10* (2013.01); *B01D 2315/16* (2013.01)

(58) Field of Classification Search
CPC .......... B01D 2313/20; B01D 2313/025; B01D 2315/10; B01D 2313/04; B01D 25/215; B01D 29/05; B01D 61/08; B01D 61/10; B01D 63/08; B01D 63/084; B01D 63/085; B01D 63/087; B01D 63/088; B01D 69/06; B01D 69/10; B01D 2201/0423; B01D 2201/302; B01D 2201/304; B01D 2201/305; B01D 2201/34; B01D 2313/02; B01D 2313/14; B01D 2313/23; C02F 1/002; C02F 9/005; A61M 2005/1657; B67D 2210/00031; F16B 2200/509

See application file for complete search history.

(56) References Cited

U.S. PATENT DOCUMENTS

| | | | |
|---|---|---|---|
| 5,868,930 | A | 2/1999 | Kopf |
| 6,852,289 | B2 | 2/2005 | Gordon et al. |
| 7,419,056 | B2 | 9/2008 | Gattefosse et al. |
| 8,273,245 | B2 | 9/2012 | Jovanovic et al. |
| 2002/0139741 | A1 | 10/2002 | Kopf, III |
| 2006/0125187 | A1 | 6/2006 | Bartlett et al. |
| 2008/0257813 | A1* | 10/2008 | Proulx ................. B01D 63/084 210/321.75 |
| 2011/0174711 | A1* | 7/2011 | Morrissey ........... B01D 63/082 210/230 |
| 2011/0284600 | A1 | 11/2011 | May |
| 2013/0015119 | A1* | 1/2013 | Pugh .................... B01D 63/087 210/321.6 |
| 2016/0243502 | A1* | 8/2016 | Vincent ................ C12N 5/0602 |

FOREIGN PATENT DOCUMENTS

| | | |
|---|---|---|
| CN | 202311743 U | 7/2012 |
| CN | 203750238 U | 8/2014 |
| EP | 0036926 A1 | 10/1981 |
| EP | 0662341 A1 | 7/1995 |
| EP | 1974801 A2 | 10/2008 |
| EP | 2292319 A1 | 3/2011 |
| EP | 3316995 A1 | 5/2018 |
| GB | 2360958 A | 10/2001 |
| WO | 2004/011134 A1 | 2/2004 |
| WO | 2011/066498 A2 | 6/2011 |
| WO | WO-2015063490 A1 * | 5/2015 ............ B01D 63/06 |
| WO | 2017/003625 A1 | 1/2017 |

OTHER PUBLICATIONS

European Search Report Received for European Patent Application No. 16818423.2, dated Feb. 5, 2019, 11 pages.
International Preliminary Report on Patentability received for PCT Application No. PCT/US2016/035133, dated Jan. 11, 2018, 10 pages.
Communication pursuant to Article 94(3) EPC received for European Patent Application No. 16818423.2, dated Oct. 16, 2019, 7 pages.
Fricher Connalia, "Plastic Equipment and Processing Technology", Hunan Science and Technology Press, Dec. 31, 2014, p. 557.

* cited by examiner

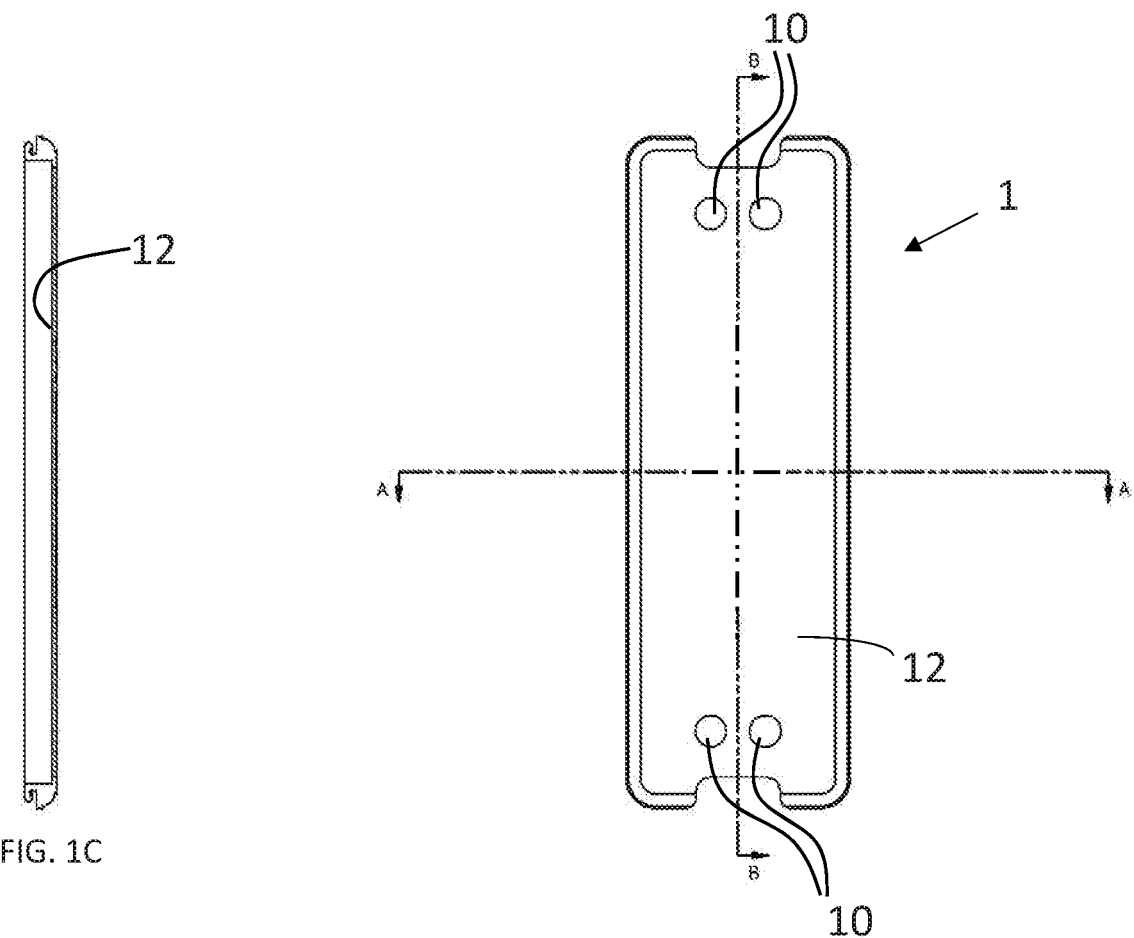

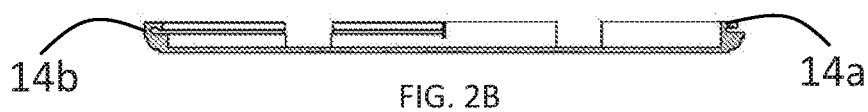
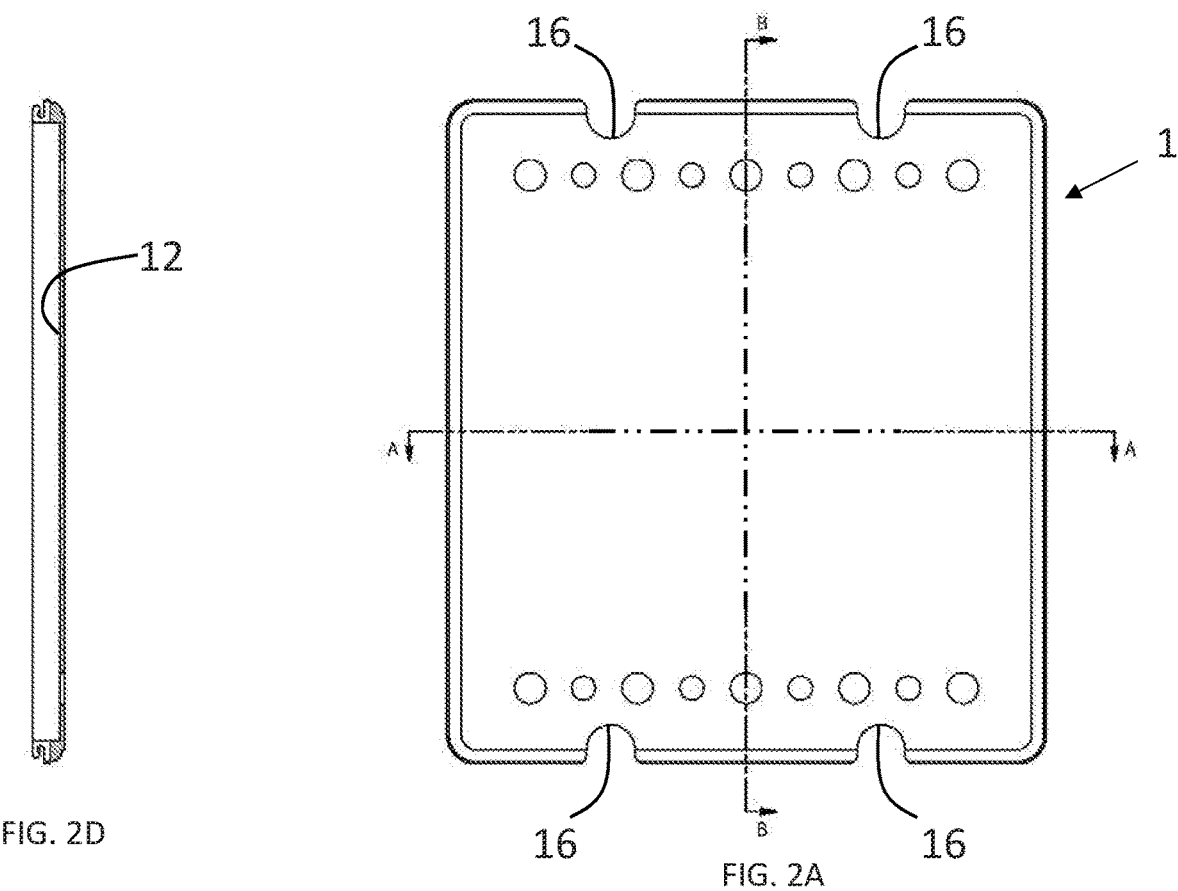
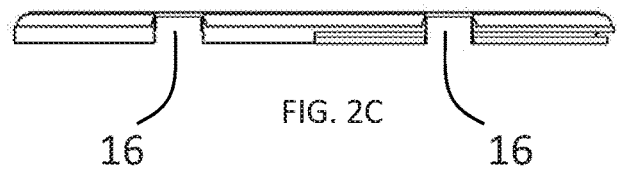

SEALING CASE FOR FILTER CASSETTE

CROSS-REFERENCE TO RELATED APPLICATIONS

The present application is a US National Stage application of International Application No. PCT/US2016/035133, filed Jun. 1, 2016, which claims the benefit of priority of U.S. Provisional Patent Application No. 62/186,773, filed Jun. 30, 2015, each of which is incorporated by reference herein in its entirety.

RELEVANT FIELD

Devices for filtering fluids such as pharmaceutical fluids and gaskets for sealing the devices.

BACKGROUND

Tangential Flow Filtration (TFF) is a separation process that uses membranes to separate components in a liquid solution or suspension on the basis of size or molecular weight differences. Applications include concentration, clarification, and desalting of proteins and other biomolecules such as nucleotides, antigens, and monoclonal antibodies; buffer exchange; process development; membrane selection studies; pre-chromatographic clarification to remove colloidal particles; depyrogenation of small molecules such as dextrose and antibiotics; harvesting, washing or clarification of cell cultures, lysates, colloidal suspensions and viral cultures; and sample preparation.

Conventional TFF devices are constructed by layering sheets of filtration membranes and woven screens. The TFF device can be contained in a cassette format. Separate sealing gaskets are placed on both sides of the cassette and this assembly is installed in a filtration system between a set of top and bottom manifolds or holders. The manifolds or holders serve to distribute the filtration fluid stream across the multiple flow paths within the TFF device. The manifolds or holders are clamped together and provide a mechanical constraint against the TFF device and gaskets to achieve the desired fluid sealing. A typical filtration system can comprise many cassettes and therefore many gaskets. However, the installation of many cassettes and gaskets is not only tedious for the user, but it is also prone to problems with gaskets falling out during installation, repair or replacement. Furthermore, even one improperly aligned or improperly seated gasket can result in a system leak. If a leak occurs, the whole system of cassettes and gaskets needs to be removed and the installation repeated.

A need exists to simplify the installation and use of filtration cassettes in a reliable manner that avoids the problems of improper assembly and leaking.

SUMMARY

Described herein is a sealing case for a filtration cassette that reliably prevents leaks after assembly and installation into a filtration system. Unlike prior art devices that depend on bonding, overmolding and/or using adhesives to join a sealing gasket to a filtration device to obtain a fluid-tight seal, the present invention avoids these cumbersome and problematic steps by providing a sealing case that fits on the filtration cassette and provides a fluid-tight seal between the sealing case and around at least one port in the filtration cassette when installed in a filtration system.

The basic shape of a typical TFF filtration cassette is essentially a rectangular cuboid. The filtration cassette having two major surfaces (that may be referred to as front and back surfaces) and four lateral side surfaces. In one embodiment, the sealing case surrounds at least the two major surfaces and at least one lateral surface. In another embodiment, the sealing case surrounds at least four, five or all six sides of the filtration cassette, wherein at least two of the sides that are surrounded by the sealing case includes the front and back surfaces.

In another embodiment, the sealing case has an internal surface that is flat or substantially flat. For example, the internal surface does not have protrusions or raised areas that align with a port hole in the filtration cassette.

In another embodiment, the sealing case comprises two halves that mate together. For example, in a particular embodiment, the two halves of the sealing case are identical. In another embodiment, the two halves of the sealing case are not identical.

In one embodiment, the sealing case is an elastomeric material. In a particular embodiment, the sealing case is a thermoplastic elastomeric material. In another embodiment, the sealing case is a thermoset material.

As further described herein, the sealing case can be used with a filtration cassette such as a tangential flow filtration (TFF) cassette.

Also provided herein is a filtration device comprising both a filtration cassette and a sealing case as described above and further described below. Furthermore, a filtration system is also provided that comprises one or more of the described filtration devices and a pair of manifolds or holders, wherein the filtration devices have a fluid-tight seal when installed in the filtration system.

BRIEF DESCRIPTION OF THE DRAWINGS

The drawings are provided to illustrate certain embodiments of the present invention and are not to be construed as limiting the scope of the claims.

FIG. 1A is a top view of one half of a sealing case for a small filtration cassette.

FIG. 1B is a side view along line A-A in FIG. 1A.

FIG. 1C is a side view along line B-B in FIG. 1A.

FIG. 2A is a top view of one half of a sealing case for a large filtration cassette.

FIG. 2B is a side view along line A-A in FIG. 2A.

FIG. 2C is a side view of the sealing case in FIG. 2A in an inverted position.

FIG. 2D is a side view along line B-B in FIG. 2A.

DETAILED DESCRIPTION

FIG. 1A shows one half of a sealing case 1 suitable for using with a filtration cassette of similar size and shape. As will be appreciated, the dimensions of a sealing case can be adapted to any suitable size such that the case can be fitted onto a filtration cassette of interest. Examples of filtration cassettes that are commercially available include Pellicon®2 ultrafiltration cassettes (EMD Millipore Corporation, Billerica Mass.), as well as others known in the industry.

The sealing case is preferably formed of an elastomeric material, such as a thermoplastic elastomer, which can be selected according the needs. For example, the choice of material may for compatibility with the fluid being handled, chemical stability, expected service life (e.g., single-use, multiple-use, under continuous or repeated clamping pressure for longer or shorter periods of time), etc. Suitable materials include, but are not limited to, thermoplastic elastomers which can be formed of styrenic block copolymers, blends of ethylene-propylene-diene monomer (EPDM) and polypropylene and the like and which are sold under brand names such as SANTOPRENE® polymer, KRATON® thermoplastic elastomer and DYNAFLEX® elastomer, EPDM rubber, thermosets, silicone, and rubbers, either natural or synthetic. In one embodiment, the sealing case may be made of two or more materials. For example, the sealing case can comprise a rigid thermoplastic component and an elastomeric material, such as a thermoplastic elastomer. For example, one or more surfaces may comprise a rigid thermoplastic component with the sealing surfaces comprising an elastomeric material. The rigid thermoplastic component may provide structural integrity, for example. The elastomeric material can be overmolded onto the rigid thermoplastic component using art standard techniques.

The sealing case has one or more openings 10 that correspond and align with at least one or more ports in a filtration cassette (not shown) to which the sealing case is to be fitted. The sealing case is fitted to a filtration cassette by mating two halves of the sealing case 1. In particular, the sealing case is fitted to the filtration cassette without use of an adhesive or other bonding method. For example, the case is not overmolded onto a filtration cassette. Instead, two halves of the sealing case 1 are placed around a filtration cassette and mated together. Many configurations may be used to mate the two halves of the sealing case together as will be appreciated by those of skill in the art. For example, as illustrated more particularly in FIG. 1B, the edges of the sealing case may have a two-step indentation 14a designed to fit a complementarily shaped 14b counterpart in the other half of the sealing case.

Both halves of the sealing case can be identical. FIG. 1B exemplifies one design of this embodiment where one half of a sealing case is identical to its complementary half. A similar design is exemplified in FIG. 2B. The two identical halves of a sealing case can be suitably mated by inverting one sealing case half and rotating 180° relative to the other sealing case half. While this may be one preferred embodiment, it is equally contemplated that the two halves of a sealing case are not identical, but which are still complementary such that the two halves can be mated together.

In addition to the two-step indentation, other configurations for mating two halves of a sealing case can be used. For example, "ball and socket" projections and indentations, where the ball may be spherical, cuboid, rhomboid, or other such shapes. Alternatively, a variety of ridges and grooves may be used. Still further, two halves may be joined by a mating strip that joins to each half together (e.g., through complementary grooves or indentations) around the perimeter of each half. These and other "snap-fit" combinations are known in the art. It will also be appreciated that more than one mating configuration may be used.

In one embodiment, the two halves of the sealing case are separate before fitting onto a filtration cassette. In another embodiment, the two halves of the sealing case are joined, for example at one edge with a hinge, before fitting onto a filtration cassette.

As particularly shown in FIG. 1C and FIG. 2D, the internal surface 12 of the sealing case, which is the side of the case that will be adjacent to the filtration cassette once assembled, is flat or essentially flat. That is, the internal surface is without raised projections, edges or lips, particularly at or near the one or more openings 10. Specifically, the internal surface 12 of the sealing case 1 does not protrude either partially or completely into a corresponding port of a filtration cassette after fitting the sealing case 1 to the filtration cassette. While a flat or essentially flat internal surface 12 is preferred, it may be contemplated that the internal surface adjacent the openings 10 may have a raised edge or ring that does not protrude either partially or completely into a corresponding port of a filtration cassette, but surrounds the opening 10.

Indentations 16 in the sealing case shown in FIGS. 2A and 2C, correspond and align with similar indentations on a filtration cassette (not shown). The indentations 16 in the sealing case and the filtration cassette accommodate the use of tie rods, threaded pins or bolts or other such clamping devices as conventionally used with the manifolds or holders to align the filtration cassettes and secure the assembly of the filtration system. The filtration system may comprise one or more filtration cassettes, each fitted with a sealing case. Once assembled, the clamping holder and clamping device exerts pressure on the filtration cassettes fitted with the sealing case such that a fluid-tight seal is formed around the one or more ports on each of the filtration cassette.

Advantageously, the sealing case provides a fluid-tight seal without the need for separate gaskets and without the need to bond a gasket to the filtration cassette. The use of a sealing case as described herein reliably prevents leaks after assembly and installation into a filtration system. The assembly is efficient and is less labor-intensive for the user. The sealing case may be provided as a pre-sterilized unit with the filtration cassette. The sealing case and filtration cassette can be disposed after a single use and need not be reused, thus eliminating a need for additional dismantling and re-sterilization steps.

While this invention has been particularly shown and described with reference to example embodiments thereof, it will be understood by those skilled in the art that various changes in form and details may be made therein without departing from the scope of the invention encompassed by the appended claims. It should also be appreciated that the various technical features of the described devices may be combined in various ways to produce alternative and additional embodiments.

The teachings of all patents, published patent applications, and references cited herein are incorporated by reference in their entirety.

What is claimed is:

1. A filtration device comprising a filtration cassette and a sealing case that is not bonded or overmolded to the filtration cassette, wherein the sealing case comprises two halves that are configured to mate together using a snap-fit combination, the snap-fit combination comprising one half of the sealing case that comprises an edge having a first indentation and a second half of the sealing case comprises a second edge having a second indentation complementary to the first indentation, and be fitted onto a filtration cassette without the use of an adhesive or other bonding method, and the sealing case surrounds the filtration cassette on at least four side all six surfaces of the filtration cassette, the sealing case further comprising at least one opening that aligns with at least one port in the filtration cassette, wherein the internal surface of the sealing case is flat and does not protrude into the at least one port in the filtration cassette, the filtration device forming a fluid-tight seal between the sealing case and around the at least one port in the filtration cassette when installed in a filtration system, wherein the sealing case is gasket-free and the filtration cassette is a tangential flow filtration (TFF) cassette.

2. The filtration device of claim 1, wherein the two halves of the sealing case are identical.

3. The filtration device of claim 1, wherein the sealing case is an elastomeric material.

4. The filtration device of claim 3, wherein the elastomeric material is a thermoplastic elastomer.

5. A sealing case having a flat internal surface, comprising: a first half; a second half complementary to and configured for joining with the first half using two mating strips comprising complementary grooves or indentations around the perimeter of each half, and a snap fit connection of said mating strips to form the sealing case capable of being fitted over a filtration cassette having at least one port, wherein the sealing case is configured not to protrude into the at least one port in the filtration cassette and is not bonded or over-molded to the filtration cassette and when positioned on the filtration cassette surrounds at least four sides of the filtration cassette and forms a fluid-tight seal between the sealing case and around at least one port in the filtration cassette when installed in a filtration system, wherein the sealing case is gasket-free, wherein the two halves of the sealing case are identical, and the sealing case is capable of being fitted over a tangential flow filtration (TFF) cassette.

6. The sealing case of claim 5, wherein the sealing case is an elastomeric material.

7. The sealing case of claim 6, wherein the sealing case is a thermoplastic elastomeric material.

* * * * *